(12) United States Patent
Graupner

(10) Patent No.: US 8,087,025 B1
(45) Date of Patent: Dec. 27, 2011

(54) WORKLOAD PLACEMENT AMONG RESOURCE-ON-DEMAND SYSTEMS

(75) Inventor: Sven Graupner, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1945 days.

(21) Appl. No.: 11/170,219

(22) Filed: Jun. 29, 2005

Related U.S. Application Data

(60) Provisional application No. 60/583,843, filed on Jun. 30, 2004.

(51) Int. Cl.
*G06F 9/46* (2006.01)
(52) U.S. Cl. ........................................................ 718/104
(58) Field of Classification Search .................. 706/19; 709/225–226, 202; 718/104; 707/10
See application file for complete search history.

(56) References Cited

U.S. PATENT DOCUMENTS

| | | | |
|---|---|---|---|
| 6,192,364 B1* | 2/2001 | Baclawski | 707/10 |
| 6,907,607 B1* | 6/2005 | Mummert et al. | 718/104 |
| 7,213,047 B2* | 5/2007 | Yeager et al. | 709/202 |
| 2004/0143560 A1* | 7/2004 | Zhu | 706/19 |
| 2005/0138175 A1* | 6/2005 | Kumar et al. | 709/226 |
| 2005/0198290 A1* | 9/2005 | Berkey et al. | 709/225 |
| 2005/0204042 A1* | 9/2005 | Banerjee et al. | 709/226 |

OTHER PUBLICATIONS

Kee et al. ("Efficient Resource Description and High Quality Selection for Virtual Grids", Computer Science & Engineering and Center for Networked Systems, University of California, San Diego, IEEE, 2005).*

Dinda et al. ("Nondeterministic Queries in a Relational Grid Information Service"; Supercomputing, 2003 ACM/IEEE Conference, Nov. 2003).*

Ahmed, K. et al., "The Cluster as Server: An Integrated Approach to Managing Clusters", downloaded Jun. 29, 2005.

Dorigo, M. et al., "The Ant System: Optimization by a Coloy of Cooperating Agents", IEEE Transactions on Systems, Man, and Cybernetics—Part B, vol. 26, No. 1, 1996.

Estrin, D. et al., "Next Century Challenges: Scalabe Coordination in Sensor Networks", Mobicom '99, Seattle, WA, 1999.

Foster, I. et al., "The Grid: Blueprint for a New Computing Infrastructure", Morgan Kaufmann Publishers, 1999, pp. 279-293.

Ratnasamy, S. et al., "A Scalable Content-Addressable Network", downloaded Jun. 29, 2005.

Schoonderwoerd, R. et al., "Ants for Load Balancing in Telecommunications Networks", downloaded Jun. 29, 2005.

Werger, B. et al., "From Insect to Internet: Situated Control for Networked Robot Teams", Annals of Mathematics and Artificial Intelligence, 2000.

"Open Grid Services Infrastructure (OGSI)" Version 1.0, Jun. 27, 2003, http://www.ggf.org/ogsi-wg.

HP Smartfrog, http://www.hpl.hp.com/research/smartfrog/, downloaded Jan. 25, 2005.

HP Utility Data Center, http://h71028.www7.hp.com/enterprise/cache/4269-0-0-0-121.aspx, downloaded Jan. 25, 2005.

(Continued)

*Primary Examiner* — Meng An
*Assistant Examiner* — Eric Wai

(57) ABSTRACT

Each of a plurality of nodes in an overlay network includes information for a corresponding resource-on-demand system, wherein the information may be used to select a resource-on-demand system to host the workload. A request to place a workload is received at a node in an overlay network. A distributed control algorithm is executed for selecting a resource-on-demand system host the workload.

35 Claims, 5 Drawing Sheets

OTHER PUBLICATIONS

IBM, Autonomic Computing Manifesto, http:www.research.ibm.com/autonomic/manifesto, downloaded Jun. 29, 2005.
IBM eLiza, http://www-1.ibm.com/servers/autonomic/, downloaded Jun. 27, 2005.
IBM xCat, http://www.alphaworks.ibm.com/tech/xCAT, downloaded Jun. 26, 2005.
IBM, Oceano Project, http://www.research.ibm.com/oceanoproject/, downloaded Jun. 27, 2005.
OpsWare, http://www.opsware.com/, downloaded Jun. 27, 2005.
SAP, downloaded Jun. 29, 2005.
Sun Microsystems, http://www.sun.com/software/gridware/, downloaded Jan. 26, 2005.

* cited by examiner

WORKLOAD PLACEMENT AMONG RESOURCE-ON-DEMAND SYSTEMS

PRIORITY

The present application claims priority under 35 U.S.C. §119(e) to the Provisional U.S. Patent Application Ser. No. 60/583,843 filed on Jun. 30, 2004.

TECHNICAL FIELD

This technical field relates generally to determining placement of a workload.

BACKGROUND

Grid computing services, utility-based data centers, and other types of resource-on-demand systems are becomingly increasingly popular as a means for efficiently and cost-effectively taking advantage of computer resources to meet the computing demands of users. In certain situations, many resource-on-demand systems may be available for running a workload of a user. However, only some of those systems may actually have the capacity to run the workload. Currently, there may be no automated process for determining which resource-on-demand system has the capacity to accept and run a new workload.

SUMMARY

According to an embodiment, each of a plurality of nodes in an overlay network includes information for a corresponding resource-on-demand system, wherein the information may be used to select a resource-on-demand system to host the workload. A request to place a workload is received at a node in an overlay network. A distributed control algorithm is executed for selecting a resource-on-demand system to host the workload.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented in, all types of network systems, and that any such variations do not depart from the true spirit and scope of the embodiments. Moreover, in the following detailed description, references are made to the accompanying figures, which illustrate specific embodiments. Changes may be made to the embodiments without departing from the spirit and scope of the embodiments.

1. System Overview

Figure 1:
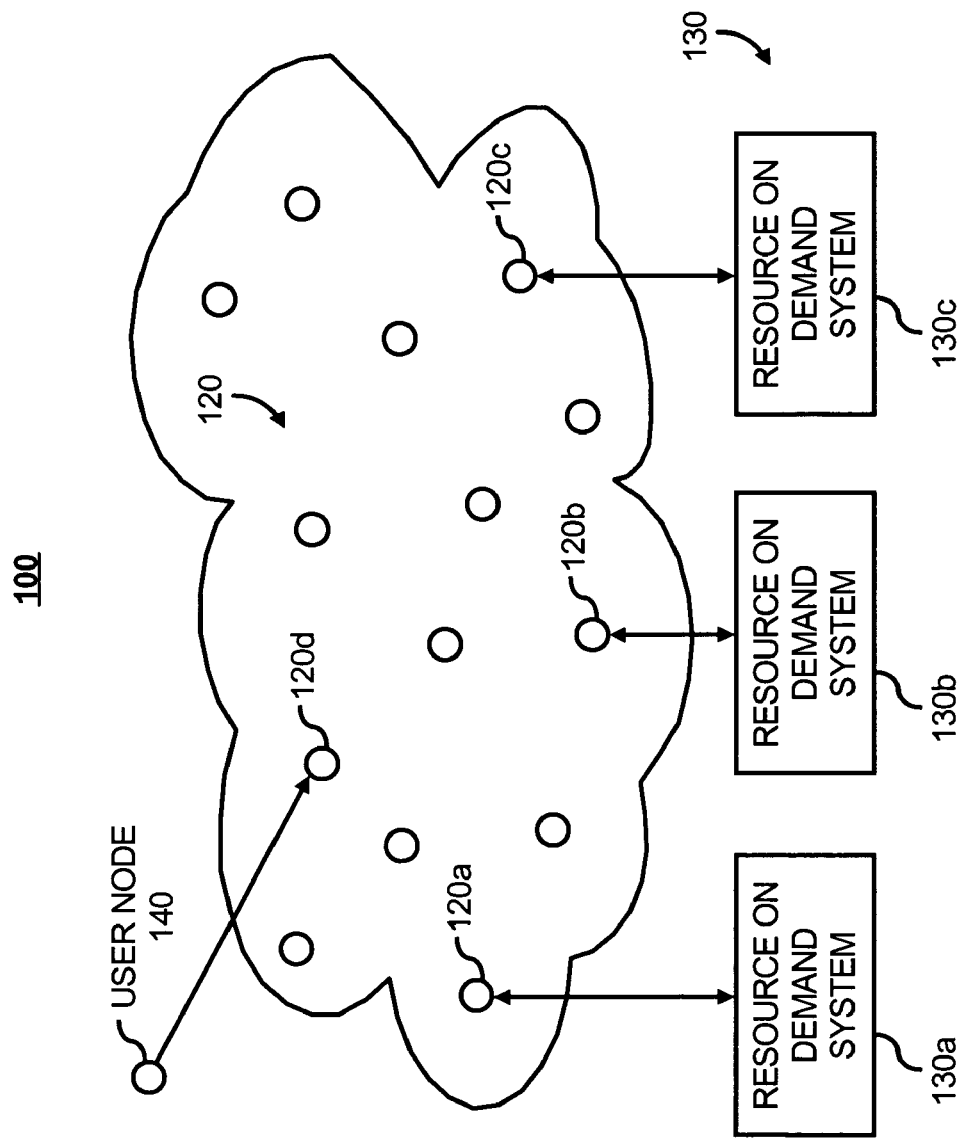
FIG. 1 illustrates a system, according to an embodiment.

FIG. 1 illustrates a system 100 according to an embodiment that is operable to place a workload. The system 100 includes an overlay network 110 and resource-on-demand systems 130. The system 100 may also include user nodes. A single user node 140 is shown, but the system 100 may include many user nodes.

The overlay network 110 is a logical representation of an underlying physical network including overlay nodes 120. In one embodiment, the underlying physical network is a peer-to-peer network but other types of networks may be used such as hierarchy. An overlay node as used herein may include computer programs and data for performing the functions of an overlay node, which includes but is not limited to decision making for workload placement. The node is hosted on a computer system, such as a server or other type of computer system. A user node may include computer programs and/or data for a user, and the user node is also hosted by a computer system.

The overlay network 110 may be established during deployment and forms a decentralized, distributed structure, which may be scalable to planetary scales of service grids. The overlay network 110 is used to store information about resource-on-demand systems and execute a distributed control algorithm for decision making about selecting a resource-on-demand system for workload placement or for decision making about allocating resources within resource-on-demand systems. For example, the distributed control algorithm, which may include a workload placement algorithm, is used to select a resource-on-demand system to host a workload. A workload includes one or more software applications, referred to as applications. A distributed control algorithm is an algorithm that may be executed by more than one node. For example, the distributed control algorithm for workload placement includes an algorithm where placement decisions for placing a workload may be made at different overlay nodes or may involve data stored at different overlay nodes.

In another example, a distributed control algorithm observes whether capacity-demand conditions are kept in balance throughout the overlay topology and eventually triggers control actions directed to resource-on-demand systems causing adjustments therein. Information relevant to workload placement is stored and maintained in the overlay network 110.

The resource-on-demand systems 130 include systems that are operable to host a workload such as a data center. The resource-on-demand systems 130 may include systems that are operable to provision resources for the workload if the system is selected or requested to host the workload. Provisioning resources, for example, includes assigning resources in the system to workloads hosted by the system. In an embodiment, the systems are operable to change resource assignments to accommodate changing workload demands or to accommodate new workloads.

In one embodiment, the resource-on-demand systems are operable to provide different configurations that may have different capacities. A configuration, also referred to as a resource-on-demand system configuration, is an assignment of resources to workload. For example, in one configuration, the resources in a resource-on-demand system are configured for balancing workload demand and in another configuration the resources are configured for packing. For packing, the resource-on-demand system attempts to place as much workload as possible on to each resource. For example, the resources may be partitioned into server groups. Instead of balancing the workload of the resource-on-demand system between the server groups, the workload of the resource-on-demand system is packed onto, for example, one or two of the server groups leaving more capacity for running new workloads than when in a balanced configuration.

One example of a resource-on-demand system is a data center. The data center includes resources, such as servers. In one example, the data center is operable to provision servers to workloads based on varying workload demands. Also, in addition to being able to provision entire servers, the data center may provision virtual servers, which may be a combination of processors, memory and other resources not necessarily on a single server. Built-in intelligence in the data center provides self-adapting capabilities to scale resources up or down depending on demand while providing a consistent level of service.

The resource-on-demand systems may include monitoring systems for measuring predetermined metrics of resources, such as CPU utilization, memory utilization, I/O bandwidth, communication bandwidth, etc., as is known in the art. These metrics are used to compute capacities and utilized capacities for resource-on-demand systems. The metrics and/or the computed capacities and utilizations may be transmitted from the resource-on-demand systems to overlay networks storing information for corresponding resource-on-demand systems. Also, resource-on-demand systems may include resource allocation and scheduling systems for assigning resources to workloads, which may be based on instructions received from overlay nodes. Schedulers are known in the art.

The user nodes are nodes that may include workloads that need to be placed and may be operable to send requests to the overlay network 110 for placing a workload. Although not shown, the user nodes, the overlay node 120 and the resource-on-demand systems 120 may communicate via one or more networks.

According to an embodiment, each of the overlay nodes 120 stores data about a particular resource-on-demand system, referred to as a corresponding resource-on-demand system for an overlay network. For example, as shown in FIG. 1, the overlay nodes 120*a-c* store information about the corresponding resource-on-demand systems 130*a-c* respectively. The information stored in each overlay node allows a node to decide whether a resource-on-demand system has sufficient capacity to accept and run a new workload. Examples of the information stored in each overlay node include deployed capacity, available capacity and utilized capacity for different configurations, such as described in further detail below.

In one example, the user node 140 sends a request to the overlay network 110 to place a workload. For example, the user node 140 sends the request to the overlay node 120*d*. In order to identify an overlay node for sending the request, the user node 140, for example, may have previously received an IP address of an overlay node or randomly selects an overlay node based on knowledge about neighbors in the network.

The overlay node 120*d* receiving the request uses a workload placement, distributed control algorithm to select a resource-on-demand system for placing the workload. After a resource-on-demand system is selected, the user node 140 or another node sends information for running the workload to the resource-on-demand system such that the resource-on-demand system is operable to provision resources for the workload and run the workload.

In other examples, a resource-on-demand system may send a request to place a workload to the overlay network 110 or an overlay node may initiate a workload placement control algorithm to place a workload.

2. Normalizing Resources For Making Placement Decisions

Resources may differ at different resource-on-demand systems or even within a resource-on-demand system. For example, a server in one resource-on-demand system may have 10 processors, each having a particular processing speed and 20 GB of memory, and a server in another resource-on-demand system may have 5 processors, each having a particular processing speed and 10 GB of memory. Other metrics may vary and the resources may be resources other than servers. In order to accurately compare resources and their capacities, resources and capacities are normalized according to an embodiment.

According to an embodiment, resource shares are used to compare capacities of resource-on-demand systems for workload placement decisions. A resource share represents a normalized metric normalized to a chosen base unit that can be used to express a resource-on-demand system configuration's capability of handling a maximum amount of workload demand related to a particular type of application or class of service.

A particular metric may be selected for determining resource shares. Also, resource shares may be different for different types of applications or different classes of services. For example, a resource share for a database application is different than a resource share for a web server application.

An example of normalizing resources is as follows. In this example, the particular metric selected for determining resource shares is transactions per second (TA/s). A first configuration is capable of handling 100 TA/s for a first application. A second configuration is capable of handling 250 TA/s for a second application. The second configuration, for example, may be for a second resource-on-demand system with more resources. The first and second applications may be different but they are of the same type or class. For example, database applications, such as ORACLE and SQL may be normalized to the same normalized base unit. Also, the first and second applications may be the same applications.

Resource shares are normalized to a chosen base unit, which is used as a benchmark. For example, the chosen base unit is 100 TA/s for that type of business application. 100 TA/s for that type of business application represents a resource share of 1.0. Thus, the first resource has 1.0 resource shares and the second resource has 2.5 resource shares, expressing that the second resource is 2.5 times more powerful (or has 2.5 times the capacity) than the benchmark.

Workload requirements may be expressed in terms of service shares shares, which may be based on the current utilization of resources in a resource-on-demand environment. The service shares may be expressed as a current utilization percentage of resource shares of a resource-on-demand system. Thus, the resource shares may be used to determine whether a resource-on-demand system is operable to satisfy the workload requirements of a workload being placed. Different workloads may require a different number of resource shares. For example, application sizing may be expressed in terms of resource shares. For example, the type of application is a database application serving 10 users. That application may require 1 resource share. The same database application serving 1000 users may then require 10 resource shares.

Rather than aggregating detailed internal server parameters such as numbers of CPUs, cache sizes, disk and memory configurations, and the like, the normalization process described above allows consolidating the aggregated behavior of inner parameters into one number. Respectively, workload demands can be expressed relatively to utilizations of resource capacities among the same type or same class of service through service shares.

Figure 2:
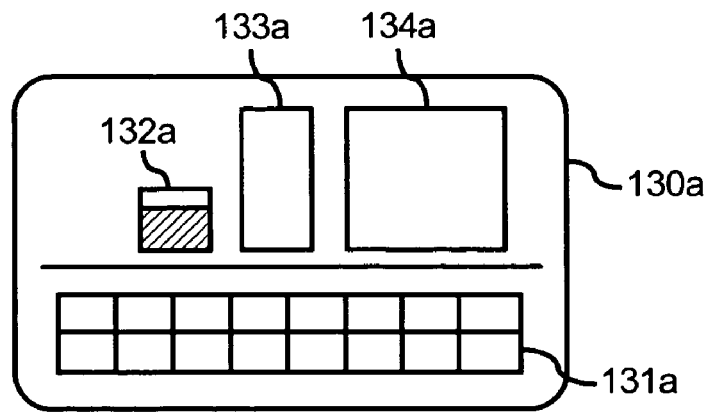
FIG. 2 illustrates resource configurations and capacities for resource-on-demand systems, according to an embodiment.
Figure 2:
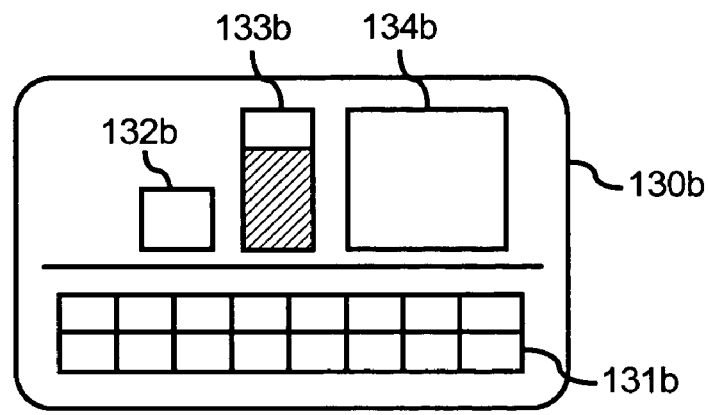
Figure 2:
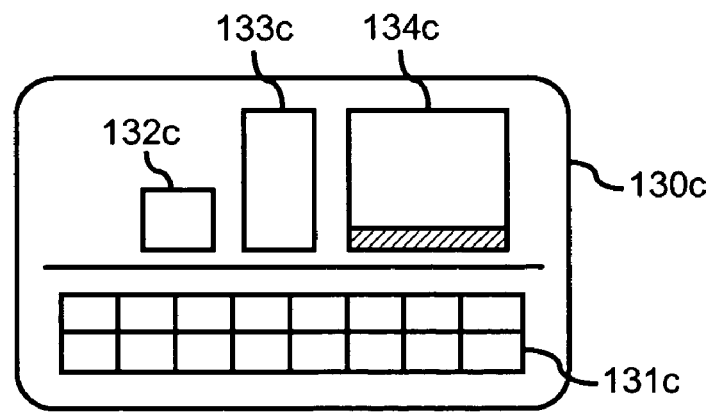

As described above, resource-on-demand systems may be operable to reconfigure resources and may be operable to employ different configurations having different capacities. Data centers are examples of systems where resources are provided according to an application's demands. FIG. 2 shows three resource-on-demand systems, such as resource-on-demand systems 130a-c also shown in FIG. 1. In this example, the resource-on-demand systems 130a-c are each operable to provide three different configurations for hosting applications. FIG. 2 shows a representation of the resource-on-demand systems 130a-c. For example, the resource-on-demand systems 130a-c are shown as having resources 131a-c, and configurations 132a-c-134a-c.

The resource-on-demand systems 130a-c may have a deployed capacity and an available capacity. Deployed capacity is the capacity of a configuration currently deployed and likely running applications that are consuming a certain fraction of the capacity. Available capacity is the capacity of a configuration that may be deployed but is currently not deployed and thus available to applications. The sum of the deployed capacity and the available capacity is the maximum capacity of the resource-on-demand system. For example, the resource-on-demand system 130a has a deployed capacity of 0.5 resource shares associated with the configuration 132a. The resource-on-demand system 130b has a deployed capacity of 1.0 resource shares associated with the configuration 133b, and the resource-on-demand system 130c has a deployed capacity of 2.0 resource shares associated with the configuration 134c.

In this example, the resource-on-demand system 130a has available capacities of 2.0 and 10.0 resource shares for the configurations 133a and 134a, respectively. The resource-on-demand system 130b has available capacities of 1.0 and 2.0 resource shares for the configurations 132b and 134b, respectively, and the resource-on-demand system 130c has available capacities of 1.0 and 2.0 resource shares for the configurations 132c and 133b, respectively.

FIG. 2 also discloses utilizations for each deployed capacity, which are the service shares. The deployed capacity is, for example, a maximum capacity of a deployed configuration. However, some of that capacity may not be allocated to a new workload because that capacity is being consumed by a current workload. The capacity being used for the current workload is the utilization, which may be represented in terms of resource shares, and thus, the service shares are normalized. For example, the configuration 132a for the resource-on-demand system 130a has a utilization of 0.8, which is 80% of the deployed capacity of 0.5 resource shares. The resource-on-demand system 130b has a utilization of 0.7, which is 70% of the deployed capacity of 1.0 resource shares, and the resource-on-demand system 130c has a utilization of 0.1, which is 10% of the deployed capacity of 2.0 resource shares.

The available capacity, deployed capacity, and/or utilization for each resource-on-demand system may be determined at the resource-on-demand system and transmitted to the overlay network 110, such as to the overlay node storing information for the particular resource-on-demand system, or the available capacity, deployed capacity, and/or utilization may determined at the overly node from metrics measured at the resource-on-demand system and transmitted to the overlay node. The available capacity, deployed capacity, and/or utilization are used for workload placement decisions performed by the overlay nodes.

FIG. 2 illustrates an example of resource-on-demand systems with different configurations. It will be apparent to one of ordinary skill in the art that the number of configurations operable to be provided by each resource-on-demand system, which may include one or more configurations, may differ and the deployed and available capacities may differ. However, the capacities and utilizations for each resource-on-demand system may be compared using resource shares.

3. Overlay Network

The overlay network 110 is used for storing and maintaining information about the resource-on-demand systems and for making decisions about workload placement. For example, capacities and utilizations may be received from the resource-on-demand systems and stored in the overlay network 110. Workload placement algorithms then operate on this information through the distributed overlay nodes 120 to select resource-on-demand systems for workload placement.

In one embodiment, each overlay node includes information for a particular resource-on-demand system, referred to as the corresponding resource-on-demand system for the overlay node, which may include only one resource-on-demand system or multiple resource-on-demand systems. In addition to capacities and utilization, information about the configuration and the type of workload or class of service may also be stored in an overlay node for the resource-on-demand system.

The overlay nodes 120 publish information regarding resource-on-demand systems in the overlay network 110. The overlay nodes 110 are operable to observe dynamic parameters and initiate action, such as decision and actuation, as dictated by the observed dynamic parameters. The overlay nodes 120 are interconnected and may communicate based on neighborhood relationships or other routing procedures.

In one embodiment, overlay nodes publish information about corresponding resource-on-demand systems, such as capacities, utilizations, application type, and the like, in XML documents called descriptors. Descriptors are used to communicate information with other overlay nodes in the overlay network 110. For example, two types of descriptors may be used, such as resource descriptors and workload descriptors. Resource descriptors may include capacities and utilizations, and workload descriptors may describe application types or service classes. Both descriptors may be used to describe resource-on-demand systems or workloads to be placed.

Descriptors and XML documents are one technique for communicating data in the overlay network 110 and other techniques may be used. In addition, the overlay nodes 120 may communicate among each other any information relevant to workload placement.

Two control loops may be created for each overly node. One control loop is a loop between overlay nodes for executing a distributed algorithm, such as for determining workload placement. Another control loop for an overlay node exists between the overlay node and a resource-on-demand system for which the overlay node includes and maintains information, such as capacities, utilization, workload and resource descriptors, and the like. After an overly node, in conjunction with a distributed control algorithm, makes a decision using the first control loop, the decision is translated into an action represented, for example, in control instructions understood by the resource-on-demand system in the second control loop. The control instructions are sent to the control interfaces in the resource-on-demand system and implemented by the resource-on-demand system.

A large scale overlay network may be created. Nodes may freely join or leave the overlay network 110. Known overlay network technology may be leveraged and applied in a slightly extended fashion to accommodate the distributed algorithms described herein. In one example, the overlay network may include a distributed hash table (DHT) overlay network, such as CAN, PASTRY, or CHORD. Data placement and storage, data retrieval and routing may be performed in accordance with an implemented DHT overlay network.

According to an embodiment, data that is related by a predetermined metric is stored at nodes in close proximity in the overlay network 110. For example, the predetermined metric is latency. Latency may affect a resource-on-demand system that hosts an application that communicates with another application hosted by a different resource-on-demand system. If there is a large latency for communications between these systems, the applications may not run as efficiently. Overlay nodes associated with resource-on-demand systems with smaller latencies may be located closer in the overlay network, for example, neighbor nodes in the overlay network, than overlay nodes associated with resource-on-demand systems with greater nodes. Thus, if an overlay node searches its neighbor nodes to identify a resource-on-demand system for hosting an application, the neighbor node is likely to have a lower latency than a non-neighbor node. A neighbor node in the overlay network 110 is a node in close proximity to another overlay node in the overlay network 110. This may include an overlay node within a predetermined number of overlay hops or an overlay node within a neighbor region. Metrics other than latency may be used to determine proximity for placing data in the overlay network 110.

4. Workload Placement Algorithms

In the overlay network 110, distributed control algorithms may be used for placing workloads. A distributed control algorithm is an algorithm that executes on more than one computer system, such as the computer systems hosting the overlay nodes 120 in the overlay network 110 shown in FIG. 1. A distributed control algorithm for placing a workload may be invoked in many instances. For example, a request for placement of a new workload may initiate the algorithm. In another example, a resource-on-demand system may become overloaded or there may be a violation of a service level objective resulting in the resource-on-demand system shifting some of its workload to another resource-on-demand system, and thus possibly requiring placement of a workload in a different resource-on-demand system.

Also, when placing a workload, the distributed control algorithms may attempt to satisfy metrics or objectives. Examples include balancing loads such that utilization of each resource is in a desired range, placing applications in such a way that communication demand among them does not exceed the capacity of the links between the hosting resource-on-demand systems, and minimizing the overall network traffic aiming to place applications with high traffic close to one another.

The distributed control algorithm for selecting a resource-on-demand system to host a workload, i.e., for placing a workload, may select a resource-on-demand system to host a workload based on a probability value that represents the likelihood that a resource-on-demand system is operable to satisfy workload requirement for the workload.

The probability may be whether a resource-on-demand system can satisfy the workload requirements or not. The probability may also be how well a resource-on-demand system can satisfy the workload requirements. The probability may be determined based on one or more metrics. The metrics may be specified in the workload requirements. Examples of the metrics include required capacity of workload, which may be expressed in service shares which are determined as a function of a resource shares, and closeness of a cooperating resource-on-demand system hosting an application in communication with an application in the workload being placed. Other metrics may also be included in the workload requirements.

Also, the probability of how well a resource-on-demand system can satisfy the workload requirements may be expressed as a score when comparing multiple resource-on-demand systems. The score may represent the result of comparing one or more metrics of the workload requirements to corresponding metrics of the resource-on-demand system.

In one example, information stored at each overlay node about a corresponding resource-on-demand system includes deployed capacity for a deployed configuration, available capacity for non-deployed configurations, such as shown in FIG. 2, and service shares, such as the current utilization of the deployed capacity. This information is compared to the workload requirements of the workload to be placed. For example, the workload requirements may be expressed in terms of service shares or resource shares. For example, the currently utilization of the deployed capacity of the configuration 132*a* shown in FIG. 2 is 80% of 0.5 which is 0.4 resource shares. The workload requirements require 0.2 resource shares for the workload to be placed. The deployed configuration satisfies the workload requirements and the workload may be placed at the resource-on-demand system 130*a* using the configuration 132*a*. Other configurations in the same or other resource-on-demand systems may be greater capacity and thus may be given a greater probability for satisfying the workload requirements. One of these configurations may be selected to host the workload. Configurations with greater number of service shares may be given higher probabilities. Other metrics may be considered when determined probabilities.

Examples of distributed control algorithms that execute in the overlay network for workload placement include local random, local round robin, and local greedy search. For example, these algorithms may be used to select an overlay node from a plurality of overlay nodes randomly, or in a round robin manner or using a greedy search algorithm to select an overlay node. The selection may include a local selection. For example, an overlay node receives a request to place a workload. The overlay node selects a local node, which may include a neighbor overlay node to determine whether a corresponding resource-on-demand system can host the workload. A neighbor overlay node may be selected randomly or in a round-robin fashion. With respect to the local greedy algorithm, a neighbor overlay node is selected to minimize a heuristic function. For example, a neighbor overlay node with the smallest latency is selected.

In one example, the selected, neighbor, overlay node is evaluated to determine whether the corresponding resource-on-demand system for that neighbor, overlay node has sufficient capacity to host the workload. For example, referring to FIG. 1, the overlay node 120*d* selects a neighbor, overlay node, such as the overlay node 120*a* randomly, using a round robin selection or using a greedy search algorithm. The information stored at the overlay node 120*a* about the resource-on-demand system 130*a* is transmitted to the overlay node 120*d*, for example, in response to a request for the information. Normalizing resources in terms of resource shares may be used to compare workload requirements to capacity of the resource-on-demand system 130a for determining whether the resource-on-demand system 130a may be selected to a host the workload.

If the resource-on-demand system 130a corresponding to the selected, neighbor, overlay node 120a cannot host the workload (e.g., due to lack of available capacity), then another overlay, neighbor node is selected in the same fashion, such as randomly, through a round robin selection or a greedy selection, and evaluated to determine whether the corresponding resource-on-demand system for that neighbor, overlay node has sufficient capacity to host the workload. Workload migration or initial workload placement is initiated after a resource-on-demand system is selected.

Another example of a distributed, workload, placement algorithm is an ant algorithm. An ant is a software agent. The ant also includes data, such as workload requirements for placing a workload and, in one embodiment, information from overlay nodes that it has visited. According to an embodiment, the ant may also include intelligence, such as software including instructions or rules that are executed at overlay nodes in its path. The software may include instructions for executing a distributed control algorithm. The ant traverses a path in the overlay network 110 by visiting one or more overlay nodes 120 in the overlay network 110. As the ant traverses a path, the ant's intelligence is used to select a resource-on-demand system to a host a workload as described below, or to determine the node visited next. The ant may or may not traverse the same node twice.

The ant traverses overlay nodes in the overlay network 110 and selects an overlay node based on a probability that the corresponding resource-on-demand system can accommodate the workload being placed.

An ant is created for each workload to be placed. The ant includes the workload requirements for selecting a resource-on-demand system to host the workload. An example of workload requirements includes required capacity of the workload. The required capacity is the demand of the workload. The required capacity may be expressed in resource shares. The resource shares required for the workload to be placed may be compared to the resource shares of the corresponding resource-on-demand systems to determine the probability that a resource-on-demand system can satisfy the workload requirements. The workload requirements may include other metrics, such as a metric related to closeness of a cooperating resource-on-demand system hosting an application communicating with an application in the workload being placed. The workload requirements may include hardware and software requirements, service level objectives, and possibly other information that may be relevant for determining whether a system can host a workload.

Figure 3:
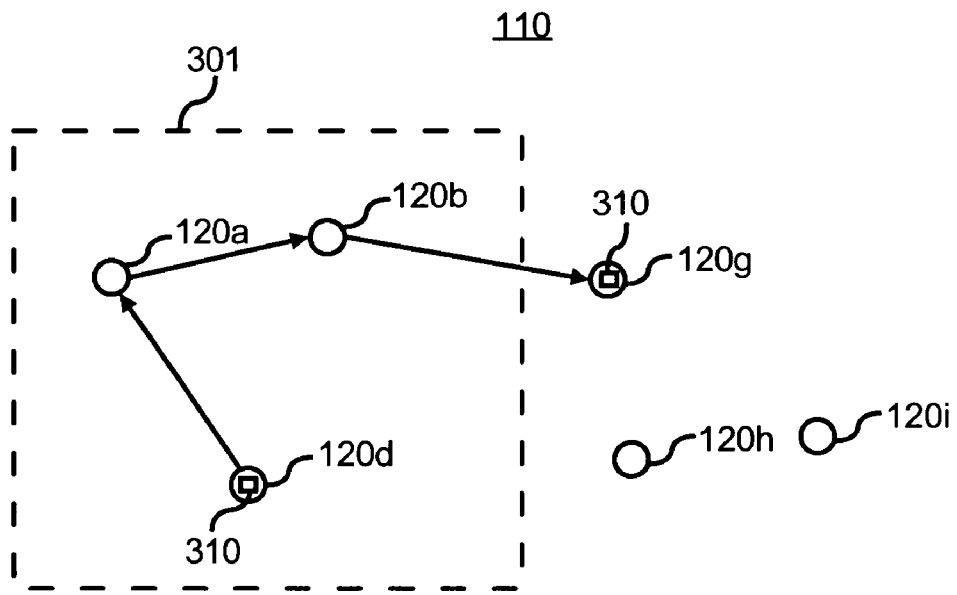
FIG. 3 illustrates an ant traversing a path according to an ant-based distributed control algorithm, according to an embodiment.

FIG. 3 illustrates one embodiment of an ant algorithm. FIG. 3 shows a portion of the overlay network 100. An ant 310 is created including the workload requirements for a workload to be placed. The ant starts at a node in the overlay network 110, such as the overlay node 120d. The starting node may be selected randomly, may be an overlay node receiving a request to place a workload, may be a node determined by hashing a metric in the workload requirements if the overlay network includes a DHT, or may be a node selecting using another algorithm. An example of hashing a metric includes hashing resource shares, which may be included as a workload requirement, and starting at the node where the hashed resource share resides.

The ant 310 determines whether the corresponding resource-on-demand system for the node 120d is operable to satisfy the workload requirements of the workload being placed. If not the, the ant selects another node, which may be a neighbor of the current node, and continues traversing a path until a corresponding resource-on-demand system is identified that can satisfy the workload requirements. As shown in FIG. 3, the resource-on-demand system corresponding to the node 120g is determined to satisfy the workload requirements and is selected to host the workload.

Many variations on this algorithm may be performed. For example, the ant may select neighbor, overlay nodes to visit first, such as the neighbor overlay nodes 120a and 102b shown in the region 301 of the overlay network before visiting other overlay nodes. An algorithm as part of the ant's intelligence may be used to select which node to visit next based on a computed probability that the selected node likely has sufficient capacity to satisfy the workload requirements. A predetermined maximum number of nodes to visit may be determined before the ant is terminated.

In another example in this embodiment, the ant travels a path from one overlay node to another, choosing overlay nodes to traverse in the path based on a probability computed locally. One example of computing the probability includes assigning a score to each overlay node.

For example, for each overlay node traversed, the ant calculates a score with respect to the workload to be placed. The score expresses how well a resource-on-demand system corresponding to a traversed overlay node is suitable for the placement of the workload.

The score for a resource-on-demand system with respect to a workload is computed based on criteria. One example of a criterion includes how well the resource-on-demand system meets the requirements of the workload based on recent utilization history of the resource-on-demand system. Another example of a criterion includes whether cooperating applications, such as applications communicating with the workload being placed or relying on data computed by the workload being placed, are or can be placed on nearby resource-on-demand systems. Closeness may be measured in terms of a metric such as geographic distance, number of hops in the network, or network latency. Another example of a criterion includes what is the amount of the weighted traffic between the current resource-on-demand system, such as system currently hosting a workload to be migrated, and resource-on-demand systems potentially hosting cooperating applications. Weight factors may include closeness between resource-on-demand system pairs.

Once a resource-on-demand system is evaluated and a score is computed for placing the workload on that resource-on-demand system, a data structure for that resource-on-demand system, called multimark, is updated with the score and with flags indicating applications cooperating with the workload being placed. The multimarks for nearby resource-on-demand systems are updated as well, both with the score for the placement of a cooperating application and with related flags for the workload being placed.

An ant's selection of which overlay node to visit next is based on the current utilization of the considered resource-on-demand system. The probability decreases with higher utilizations as well as on the value of the multimark for the workload being placed or for the multimark or score for cooperating applications. The multimark contains both the score of the ants, which visited this overlay node as well as information of the ants corresponding to its cooperating applications.

The termination of the walk of an ant is determined by a parameter set upon its creation, such as the maximum number of overlay nodes to be visited. It gives us partial control over the trade-off between responsiveness and the solution quality.

Upon termination, the ant determines the resource-on-demand system with the highest score from an internal priority list of predetermined length. The ant then sends a message to the managing agent of the selected resource-on-demand system with the suggestion to install the workload.

The ant algorithm may include carrying probabilities with the ant while traversing the path and then selecting a resource-on-demand system based on the computed probabilities, for example, at the last node visited. For example, the multimark may be updated and carried with the ant.

Figure 4:
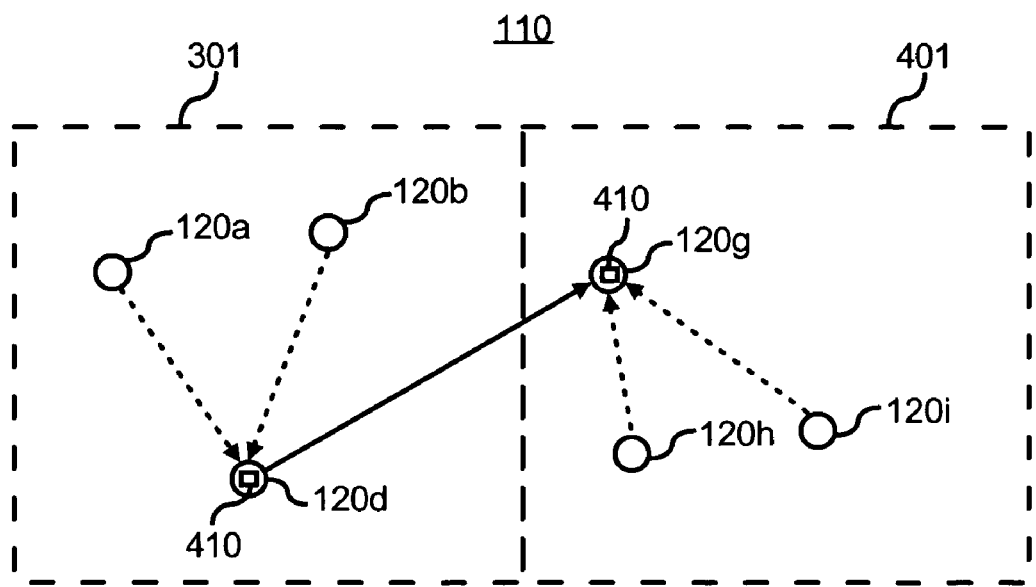
FIG. 4 illustrates an ant traversing a path according to another ant-based distributed control algorithm, according to an embodiment.

In another embodiment of the ant algorithm, the ant resides on one node receives information from the neighbor nodes, such as shown in FIG. 4 with dashed lines. Then, the ant may determine whether any of the corresponding resource-on-demand systems for the node 120d or any of the neighbor, overlay nodes 120a and 120b are operable to satisfy the workload requirements. The ant may also compute probabilities and select a resource-on-demand system based on the probabilities.

The ant may move to another overly node in another region, such as the region 401 and repeat the process. Also, the ant may move to another neighbor node and repeat the process assuming the neighbor nodes for the previously traversed node and the new node are different. The decision where to move next may be determined based on neighborhood density values, which is an aggregation of the neighbors' capacities. Asking all neighbors for their neighborhood density values allows an ant to select a neighbor node with the highest capacity density value leading to a hill climbing behavior moving towards locations with most available capacities and filling these capacities. This algorithm therefore has an inherent balancing character.

Another distributed control algorithm, according to an embodiment, used to determine workload placement through the overlay network 110 includes the broadcast of local eligibility. In this embodiment, each overlay nodes broadcasts the list of applications its corresponding resource-on-demand system hosts and simultaneously collects a list of all applications hosted by other corresponding resource-on-demand systems. Each node evaluates its own ability to host each application, for example by computing a score, and sorts the list according to the computed score. The criteria are similar to those for the ant-based control system. In addition, an application already hosted by a corresponding resource-on-demand system increases the score.

Each node broadcasts a list ordered by scores of those applications that can be hosted simultaneously without exceeding its capacity. When a node receives a score list from another node, it compares the score with its own score for an application. Each node now knows whether it is the most eligible node, i.e., most eligible corresponding resource-on-demand system, for hosting a particular service. The changes in workload placement are executed. Note that each node determines whether it has to install new or remove current applications at the end of each decision cycle.

In one embodiment of the broadcast of local eligibility algorithm, the overlay network 110 is organized as a hierarchy with multiple levels. Broadcasts are performed within each level to minimize network traffic. A cluster head of a level compares the initial list of applications with those which will be hosted at the end of a decision cycle. The remaining applications are passed on to the next hierarchy level for placement.

Figure 5:
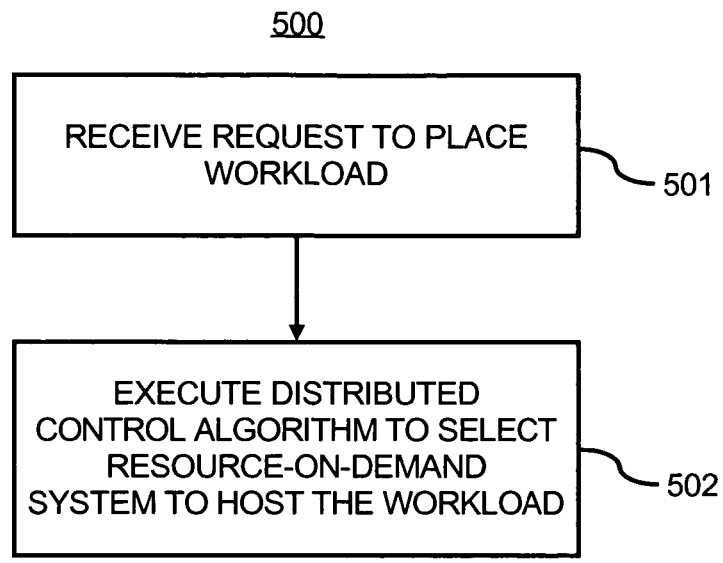
FIG. 5 illustrates a flow chart of a method for selecting a resource-on-demand system to host a workload, according to an embodiment.

FIG. 5 illustrates a flow chart of a method 500 for selecting a resource-on-demand system to host a workload. The method 500 is described with respect to one or more of the FIGS. 1-4 by way of example and not limitation.

At step 501, a node in the overlay network 110 receives a request to place a workload. The request may be a request from, for example, the user node 140 shown in FIG. 1, to place a new workload. The request may be to relocate an existing workload currently being hosted by a resource-on-demand system.

At step 502, one or more overlay nodes in the overlay network 110 executes a distributed control algorithm to select a resource-on-demand system to host the workload.

Figure 6:
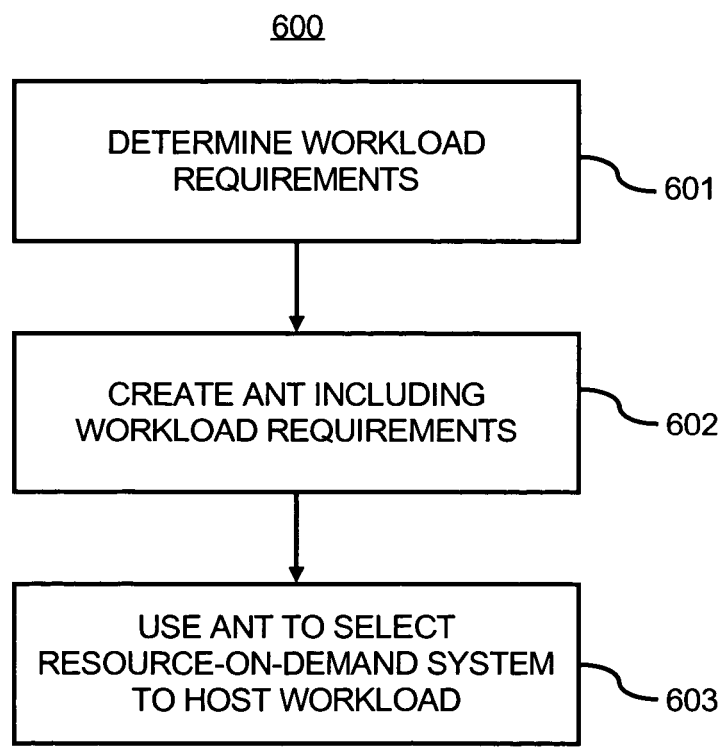
FIG. 6 illustrates a flow chart of a method for selecting a resource-on-demand system to host a workload, according to another embodiment.

FIG. 6 illustrates a flow chart of a method 600 for selecting a resource-on-demand system to host a workload using an ant-based, distributed control algorithm. The method 600 is described with respect to one or more of the FIGS. 1-4 by way of example and not limitation.

At step 601, a node in the overlay network 110 determines workload requirements for a workload. The workload requirements may have been included in a request to place the workload received by a node in the overlay network 110.

At step 602, a node in the overlay network 110 creates the ant including the workload requirements.

At step 603, the ant is used to select a resource-on-demand system to host the workload based on a probability a resource-on-demand system is operable to satisfy the workload requirements.

Figure 7:
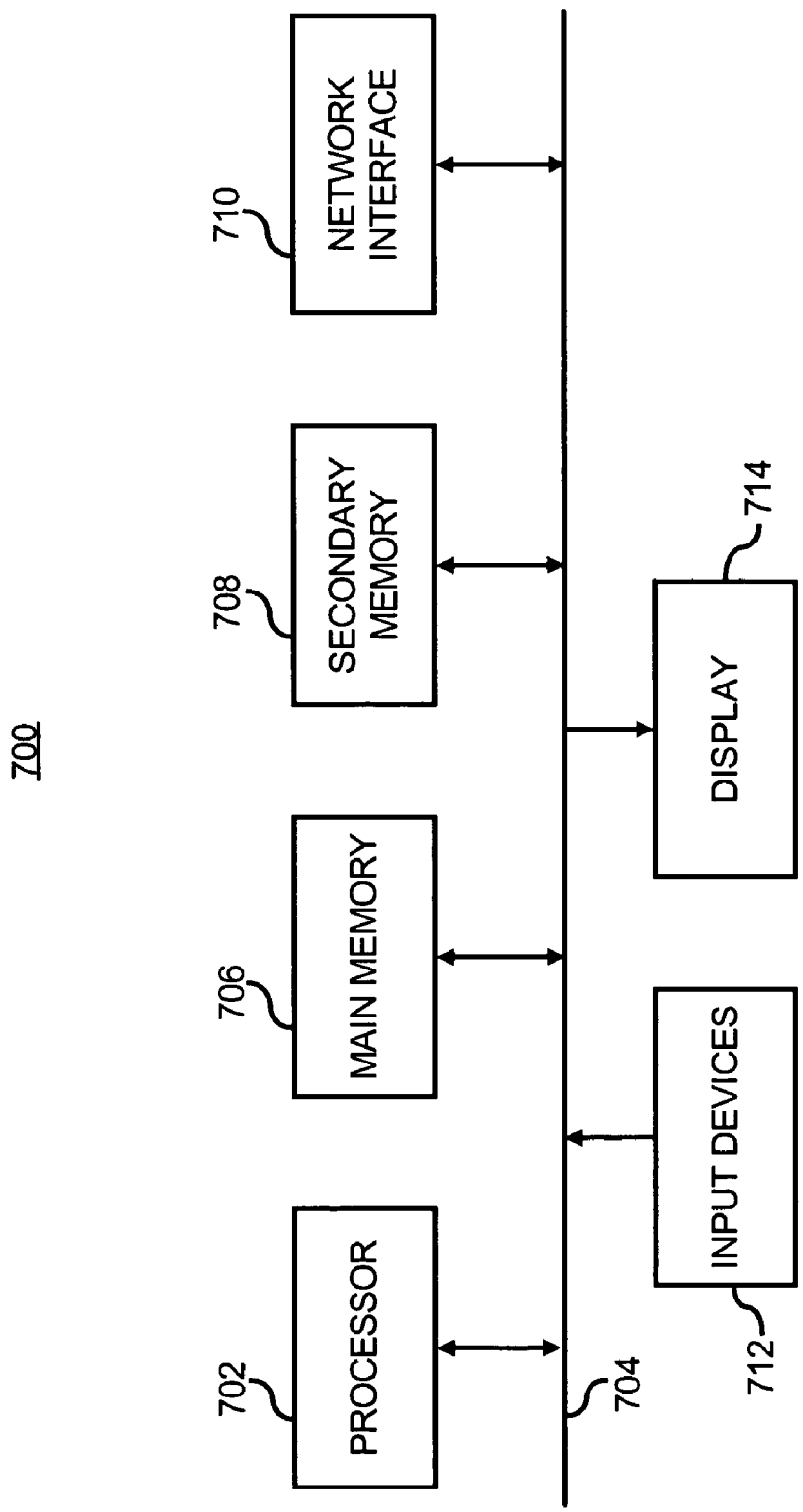
FIG. 7 illustrates a computer system, according to an embodiment.

FIG. 7 illustrates a block diagram of a general purpose computer system 700 that may be used for hosting a node in the overlay network 110. It will be apparent to one of ordinary skill in the art that a more sophisticated computer system may be used. Furthermore, components may be added or removed from the computer system 700 to provide the desired functionality.

The computer system 700 includes one or more processors, such as processor 702, providing an execution platform for executing software. Commands and data from the processor 702 are communicated over a communication bus 704. The computer system 700 also includes a main memory 706, such as a Random Access Memory (RAM), where software may be resident during runtime, and a secondary memory 708. The secondary memory 708 includes, for example, a hard disk drive and/or a removable storage drive representing a floppy diskette drive, a magnetic tape drive, a compact disk drive, etc., or a nonvolatile memory where a copy of the software may be stored. The secondary memory 708 may also include ROM (read only memory), EPROM (erasable, programmable ROM), EEPROM (electrically erasable, programmable ROM). The computer system 700 may include a display 714 and user interfaces comprising one or more input devices 712, such as a keyboard, a mouse, a stylus, and the like. The input devices 712 and the display 714 are optional. A network interface 710 is provided for communicating with other computer systems.

The main memory 706 and the secondary memory 708, either singly or in combination, are a storage device for storing information about the resource-on-demand systems, such as capacities, workload requirements and any other data that may be used in deciding workload placement. An ant and software for deciding workload placement may reside in the storage device. The processor 702, for example, is processor means for executing software for deciding workload placement, and receiver means for receiving a workload request and other communications may include the network interface 710.

The steps of the methods 500 and 600 and other steps for deciding workload placement described herein may be implemented as software stored on a computer readable medium, such as the memory 706 and/or 708, and executed on the computer system 700, for example, by the processor 702.

The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method comprising:
   determining workload requirements for a workload;
   creating, by a computer system, an ant including the workload requirements; and
   using the ant to select a resource-on-demand system from a plurality of resource-on-demand systems to host the workload based on a probability the resource-on-demand system is operable to satisfy the workload requirements,
   wherein using the ant to select a resource-on-demand system includes,
      the ant traversing a path in an overlay network, wherein the path includes a plurality of nodes in the overlay network and the overlay network is organized in a hierarchy comprising a plurality of levels;
      receiving information about corresponding resource-on-demand systems from the plurality of nodes in the overlay network, wherein the receiving of the information comprises receiving information about corresponding resource-on-demand systems from a plurality of nodes in a first level in the hierarchy; determining whether any of the corresponding resource-on-demand systems is operable to satisfy the workload requirements; and in response to none of the corresponding resource-on-demand systems being operable to satisfy the workload requirements, determining whether any of corresponding resource-on-demand systems for nodes in the overlay network in a lower-level in the hierarchy is operable to satisfy the workload requirements;
      determining a probability to satisfy the workload requirements for each resource-on-demand system corresponding to each traversed overlay node; and
      selecting one of the resource-on-demand systems to host the workload based on the determined probabilities.

2. The method of claim 1, further comprising:
   receiving a request to place the workload at a node in the overlay network,
   wherein each of the plurality of nodes in the overlay network stores information for a corresponding resource-on-demand system, the information being operable to be used to select a resource-on-demand system to host a workload.

3. The method of claim 2, further comprising:
   using a plurality of ants representing a plurality of workloads to be placed to select data centers for placing the plurality of workloads.

4. The method of claim 2, wherein using the ant to select a resource-on-demand system further comprises:
   using the ant to compare the workload requirements to the information stored in each of the plurality of nodes in the overlay network to select the resource-on-demand system to host the workload.

5. The method of claim 4, wherein using the ant to compare the workload requirements to the information stored in each of the plurality of nodes in the overlay network to select a resource-on-demand system to host the workload further comprises:
   determining whether a corresponding resource-on-demand system for a first node in the overlay network visited by the ant is operable to satisfy the workload requirements; and
   selecting the corresponding resource-on-demand system for the first node to host the application in response to the corresponding resource-on-demand system for the first node being operable to satisfy the workload requirements.

6. The method of claim 5, further comprising:
   determining whether a corresponding resource-on-demand system for a neighbor node of the first node in the overlay network is operable to satisfy the workload requirements in response to the corresponding resource-on-demand system for the first node not being operable to satisfy the workload requirements; and
   selecting the corresponding resource-on-demand system for the neighbor node to host the workload in response to the corresponding resource-on-demand system for the neighbor node being operable to satisfy the workload requirements.

7. The method of claim 6, wherein determining whether a corresponding resource-on-demand system for a neighbor node of the first node in the overlay network is operable to satisfy the workload requirements comprises:
   selecting the neighbor node of the first node as a next node for the ant to visit; and
   using the ant to determine whether the selected neighbor node or at least one neighbor node of the selected neighbor node has a corresponding resource-on-demand system operable to satisfy the workload requirements.

8. The method of claim 1, wherein determining a probability further comprises:
   determining a capacity for each resource-on-demand system;
   determining a closeness of each resource-on-demand system to a cooperating resource-on-demand system hosting an application communicating with the workload being placed; and comparing the determined capacity and the determined closeness to the workload requirements.

9. The method of claim 1, wherein the ant stops traversing nodes in the overlay network after a predetermined number of nodes have been traversed.

10. The method of claim 1, wherein using the ant to select a resource-on-demand system further comprises:
using the ant to determine capacity for at least one resource-on-demand system, wherein the capacity is utilization of a configuration of the at least one resource-on-demand system; and
comparing to the capacity to the workload requirements of the workload.

11. The method of claim 10, wherein the capacity is expressed in terms of resource shares, wherein a resource share is a normalized metric for expressing a resource-on-demand system's capability of handling a maximum amount of workload related to a particular type of application or class of service.

12. The method of claim 11, wherein the capacity is a utilization of a deployed capacity or an available capacity of a configuration of the at least one resource-on-demand system.

13. The method of claim 1, further comprising:
determining an available capacity and a deployed capacity for a resource-on-demand system; and
selecting the resource-on-demand system to host the workload if at least one of the available capacity and deployed capacity is operable to satisfy a required capacity of the workload.

14. The method of claim 1, wherein the resource-on-demand system is a data center.

15. A method comprising:
receiving an ant including workload requirements to place a workload and including a distributed control algorithm, wherein the ant is configured to traverse a plurality of nodes in an overlay network, and each of the plurality of nodes includes a computer system and the overlay network is organized in a hierarchy comprising a plurality of levels;
receiving information about corresponding resource-on-demand systems from the plurality of nodes in the overlay network, wherein the receiving of the information comprises receiving information about corresponding resource-on-demand systems from a plurality of nodes in a first level in the hierarchy; determining whether any of the corresponding resource-on-demand systems is operable to satisfy the workload requirements; and in response to none of the corresponding resource-on-demand systems being operable to satisfy the workload requirements, determining whether any of corresponding resource-on-demand systems for nodes in the overlay network in a lower-level in the hierarchy is operable to satisfy the workload requirements;
executing the distributed control algorithm of the ant at the plurality of nodes in the overlay network to select a resource-on-demand system from a plurality of resource-on-demand systems to host the workload, wherein the executing comprises determining a probability to satisfy the workload requirements for each resource-on-demand system corresponding to each traversed overlay node; and selecting one of the resource-on-demand systems to host the workload based on the determined probabilities.

16. The method of claim 15, wherein executing a distributed control algorithm further comprises:

executing a round robin search algorithm to select the resource-on-demand system for hosting the workload.

17. The method of claim 16, wherein executing a round robin search algorithm comprises:
selecting nodes in a round robin manner; and
comparing information about a corresponding resource-on-demand system from each of the nodes to the workload requirements.

18. The method of claim 15, wherein executing the distributed control algorithm further comprises:
randomly selecting the plurality of nodes in the overlay network; and
comparing information about the corresponding resource-on-demand system from each of the randomly selected nodes to the workload requirements.

19. The method of claim 15, wherein executing the distributed control algorithm further comprises:
using a greedy algorithm to select the plurality of nodes in the overlay network; and
comparing information about the corresponding resource-on-demand system from each of the plurality of nodes to the workload requirements.

20. The method of claim 15, wherein executing a distributed control algorithm further comprises:
receiving information about corresponding resource-on-demand systems from nodes in a region in the overlay network; and
comparing information about corresponding resource-on-demand system for each node in the region with the workload requirements.

21. The method of claim 15, wherein executing the distributed control algorithm further comprises:
determining capacity of the corresponding resource-on-demand system from each of the plurality of nodes in the overlay network;
comparing the capacity of the corresponding resource-on-demand system from each of the plurality of nodes with the workload requirements; and
selecting the resource-on-demand system to host the workload if there is sufficient capacity to satisfy the workload demand requirements.

22. The method of claim 21, wherein the capacity is expressed in terms of resource shares, wherein a resource share is a normalized metric for expressing a resource-on-demand system's capability of handling a maximum amount of workload related to a particular type of application or class of service.

23. The method of claim 22, wherein the capacity is a utilization of a deployed capacity or an available capacity of a configuration of the at least one resource-on-demand system.

24. An overlay network comprising a plurality of nodes and the overlay network is organized in a hierarchy comprising a plurality of levels, wherein a computer system hosting a node of the plurality of nodes comprises:
a receiver operable to receive a request for placing a workload at a resource-on-demand system, wherein each of the plurality of nodes in the overlay network stores information for a corresponding resource-on-demand system, the information being operable to be used to select a resource-on-demand system to host the workload;
a storage device storing information for a corresponding resource-on-demand system of the node; and
a processor operable to execute an ant having workload requirements for the workload for determining a probability the corresponding resource-on-demand system of the node is operable to satisfy workload requirements for hosting the workload, wherein the ant is configured to traverse a plurality of nodes in the overlay network, and selecting the resource-on-demand system to host the workload comprises receiving information about corresponding resource-on-demand systems from the plurality of nodes in the overlay network; and selecting one of the resource-on-demand systems to host the workload based on the determined probabilities, wherein the receiving of the information comprises receiving information about corresponding resource-on-demand systems from a plurality of nodes in a first level in the hierarchy; determining whether any of the corresponding resource-on-demand systems is operable to satisfy the workload requirements; and in response to none of the corresponding resource-on-demand systems being operable to satisfy the workload requirements, determining whether any of corresponding resource-on-demand systems for nodes in the overlay network in a lower-level in the hierarchy is operable to satisfy the workload requirements.

25. The computer system of claim 24, wherein the information for a corresponding resource-on-demand system comprises:

capacity for the resource-on-demand system expressed in terms of resource shares, wherein a resource share is a normalized metric for expressing a resource-on-demand system's capability of handling a maximum amount of workload related to a particular type of application or class of service.

26. The computer system of claim 25, wherein the capacity is a utilization of a deployed capacity or an available capacity of a configuration of the corresponding resource-on-demand system.

27. The computer system of claim 25, wherein the workload requirements are expressed in service shares, wherein the service shares are for the workload to be placed include the resource utilization of the workload to be placed determined as a function of the resource shares.

28. The computer system of claim 24, wherein the plurality of nodes is operable to execute a distributed control algorithm for selecting a resource-on-demand system to host the workload.

29. The computer system of claim 24, wherein the overlay network comprises a distributed-hash table overlay network.

30. The computer system of claim 24, wherein the information for corresponding resource-on-demand systems that is related by a predetermined metric is stored at nodes in close proximity in the overlay network.

31. The computer system of claim 30, wherein the predetermined metric is latency, such that workloads including applications communicating with each other are placed at resource-on-demand systems to minimize communication latency between the applications.

32. A computer system hosting a node in an overlay network comprising a plurality of nodes and the overlay network is organized in a hierarchy comprising a plurality of levels, wherein the plurality of nodes include information for corresponding resource-on-demand systems and being operable to execute a distributed control algorithm for selecting a resource-on-demand system to host a workload based on information for a corresponding resource-on-demand system in at least one of the plurality of nodes, the computer system comprising:

a receiver means for receiving a request for placing a workload at a resource-on-demand system, wherein each of the plurality of nodes in the overlay network stores information for a corresponding resource-on-demand system, the information being operable to be used to select a resource-on-demand system to host the workload;

a storage device means for storing information for a corresponding resource-on-demand system of the node; and a processor means operable to execute an ant including the distributed control algorithm for determining whether the corresponding resource-on-demand system of the node is operable to satisfy workload requirements for hosting the workload, wherein the ant is configured to traverse the plurality of nodes in the overlay network, and selecting the resource-on-demand system to host the workload comprises receiving information about corresponding resource-on-demand systems from the plurality of nodes in the overlay network; determining a probability to satisfy the workload requirements for each resource-on-demand system corresponding to each traversed overlay node; and selecting one of the resource-on-demand systems to host the workload based on the determined probabilities, wherein the receiving of the information comprises receiving information about corresponding resource-on-demand systems from a plurality of nodes in a first level in the hierarchy; determining whether any of the corresponding resource-on-demand systems is operable to satisfy the workload requirements; and in response to none of the corresponding resource-on-demand systems being operable to satisfy the workload requirements, determining whether any of corresponding resource-on-demand systems for nodes in the overlay network in a lower-level in the hierarchy is operable to satisfy the workload requirements.

33. The computer system of claim 32, wherein the information for a corresponding resource-on-demand system comprises:

capacity for the resource-on-demand system expressed in terms of resource shares, wherein a resource share is a normalized metric for expressing a resource-on-demand system's capability of handling a maximum amount of workload related to a particular type of application or class of service.

34. The computer system of claim 33, wherein the capacity is a utilization of a deployed capacity or an available capacity of a configuration of the corresponding resource-on-demand system.

35. The computer system of claim 34, wherein the workload requirements are expressed in service shares, wherein the service shares include the resource utilization of the workload to be placed determined as a function of the resource shares.

* * * * *

UNITED STATES PATENT AND TRADEMARK OFFICE
CERTIFICATE OF CORRECTION

PATENT NO.         : 8,087,025 B1                                          Page 1 of 1
APPLICATION NO.    : 11/170219
DATED              : December 27, 2011
INVENTOR(S)        : Sven Graupner It is certified that error appears in the above-identified patent and that said Letters Patent is hereby corrected as shown below:

On the title page, item (57), Abstract, in column 2, line 7, delete "system" and insert -- system to --, therefor.

Signed and Sealed this
Twenty-seventh Day of November, 2012

David J. Kappos
*Director of the United States Patent and Trademark Office*